(12) United States Patent
Bohn

(10) Patent No.: US 10,422,989 B2
(45) Date of Patent: Sep. 24, 2019

(54) OPTICAL SYSTEMS INCLUDING A SINGLE ACTUATOR AND MULTIPLE FLUID-FILLED OPTICAL LENSES FOR NEAR-EYE-DISPLAY DEVICES

(71) Applicant: MICROSOFT TECHNOLOGY LICENSING, LLC, Redmond, WA (US)

(72) Inventor: David Douglas Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/890,242

(22) Filed: Feb. 6, 2018

(65) Prior Publication Data

US 2019/0243123 A1 Aug. 8, 2019

(51) Int. Cl.
*G02B 3/00* (2006.01)
*G02B 3/14* (2006.01)
(Continued)

(52) U.S. Cl.
CPC .......... *G02B 26/004* (2013.01); *G02B 3/0068* (2013.01); *G02B 3/14* (2013.01);
(Continued)

(58) Field of Classification Search
CPC .......... G02B 3/12; G02B 3/14; G02B 6/0001; G02B 6/0011; G02B 6/122; G02B 23/02; G02B 23/10; G02B 23/017; G02B 23/0172; G02B 23/0955; G02B 23/2235; G02B 23/2242; G02B 23/2278; G02B 2027/0112; G02B 2027/0138; G02B 2027/0178; G02B 3/0068; G02B 26/004; B01L 3/00; B01L 3/50273; B01L 3/502746; B01L 3/502738;
(Continued)

(56) References Cited

U.S. PATENT DOCUMENTS

| 4,030,813 A * | 6/1977 | Kohashi | G02B 26/004 |
| | | | 359/245 |
| 4,384,761 A * | 5/1983 | Brady | G02B 26/004 |
| | | | 385/18 |

(Continued)

OTHER PUBLICATIONS

"International Search Report and Written Opinion Issued in PCT Application No. PCT/US2019/014852", dated May 16, 2019, 12 Pages.

*Primary Examiner* — Loha Ben
(74) *Attorney, Agent, or Firm* — Newport IP, LLC; Leonard J. Hope

(57) ABSTRACT

A near-eye-display device includes a pair of fluid-filled lenses. The power of an inner lens of the pair of lenses can be set to position a focal plane for a virtual object from infinity to a predefined distance. The optical power of an outer lens of the pair of lenses is set to cancel out the optical power of the inner lens. A single actuator coupled to a reservoir pumps fluid into or out of the lenses to change their optical power. When the actuator is activated, fluid flows into one of the lenses in a pair and out of the other lens in the pair. The amount of fluid in each lens in a pair of lenses is thereby maintained to cancel out the optical power of the other lens. A single actuator can also be utilized to modify the power of two or more pairs of lenses.

20 Claims, 5 Drawing Sheets

(51) Int. Cl.
*G02B 23/10* (2006.01)
*G02B 26/00* (2006.01)
*G02B 27/01* (2006.01)
*G02B 27/09* (2006.01)
*G02B 6/122* (2006.01)
*B01L 3/00* (2006.01)
*F21V 8/00* (2006.01)

(52) U.S. Cl.
CPC ......... *G02B 6/122* (2013.01); *G02B 27/0172* (2013.01); *B01L 3/50273* (2013.01); *G02B 6/0011* (2013.01); *G02B 23/10* (2013.01); *G02B 27/0955* (2013.01); *G02B 2027/0178* (2013.01)

(58) Field of Classification Search
CPC ....... B01L 3/502776; B01L 2300/0654; G01N 21/05; G01N 21/11; G01N 21/33; G01N 21/85; G01N 30/38; G01N 30/466; G01N 30/467; G01N 30/74; A61B 5/0059
USPC ....... 359/291, 228, 358, 509, 665, 666, 717, 359/832, 886; 396/26; 137/8–10, 15.19, 137/803, 806, 825, 831–833; 356/246; 250/372, 373, 458.1; 385/129, 132, 147
See application file for complete search history.

(56) References Cited

U.S. PATENT DOCUMENTS

| | | | | |
|---|---|---|---|---|
| 6,408,112 | B1* | 6/2002 | Bartels | G02B 3/14 385/16 |
| 7,324,287 | B1* | 1/2008 | Gollier | G02B 3/14 359/665 |
| 7,746,466 | B2* | 6/2010 | Godin | B01L 3/502776 250/458.1 |
| 8,638,498 | B2* | 1/2014 | Bohn | G02B 27/2242 359/412 |
| 8,664,617 | B2* | 3/2014 | Fortt | G01N 21/05 250/373 |
| 8,885,997 | B2* | 11/2014 | Nguyen | G02B 6/0076 385/37 |
| 8,998,414 | B2 | 4/2015 | Bohn | |
| 9,274,338 | B2 | 3/2016 | Robbins | |
| 9,488,836 | B2 | 11/2016 | Bohn | |
| 2016/0070038 | A1 | 3/2016 | Peyman | |
| 2017/0293145 | A1 | 10/2017 | Miller et al. | |
| 2018/0275394 | A1* | 9/2018 | Yeoh | G02B 3/14 |
| 2019/0086667 | A1* | 3/2019 | Silver | G02B 6/122 |

* cited by examiner

OPTICAL SYSTEMS INCLUDING A SINGLE ACTUATOR AND MULTIPLE FLUID-FILLED OPTICAL LENSES FOR NEAR-EYE-DISPLAY DEVICES

BACKGROUND

Near-Eye-Display ("NED") devices are computing devices that can superimpose computer-generated images ("CG images") over a user's view of a real-world environment. For example, a NED device might generate composite views to enable a user to visually perceive a CG image superimposed over a visually perceived physical object that exists within the real-world environment.

Some NED devices are large and bulky due to the presence of many complex electrical components, mechanical components, and optical components, such as lenses. As a result, some users are hesitant to place an NED device on their head, or to wear such a device for an extended period of time. In order to encourage users to utilize the functionality provided by NED devices it is, therefore, desirable to minimize the weight and size of NED devices to provide maximize user comfort.

It is with respect to these and potentially other considerations that the disclosure made herein is presented.

SUMMARY

Optical systems are disclosed herein that include a single actuator coupled to multiple variable fluid-filled optical lenses suitable for use in NED devices. By utilizing only a single actuator for modifying the optical power of multiple variable fluid-filled lenses in a NED device, the disclosed optical systems provide important technical benefits, thereby overcoming technical problems with previous optical systems used in NED devices that utilize multiple actuators. These technical benefits can include, but are not limited to, a reduction in the weight, complexity, power consumption, and cost of NED devices that utilize the disclosed optical systems. Other technical benefits might also be realized through implementations of the disclosed technologies.

According to one embodiment, an optical assembly configured for use with a NED device includes one or two pair of variable fluid-filled optical lenses. The fluid-filled lenses can be single membrane or double membrane lenses. The power of one of the lenses of each pair, which might be referred to herein as an "inner lens" due to its proximity to a user's eye, can be configured to position a focal plane for a virtual object from infinity to a predefined distance. For example, the inner lens might be configured to position the virtual object focal plane from infinity to 0.25 meters, corresponding to zero diopters to minus four diopters.

Each pair of variable fluid-filled optical lenses also includes a second optical lens, which might be referred to herein as an "outer lens," which is configured to cancel out the optical power of the inner lens to maintain a user's view of the physical world through both lenses without magnification. In the example given above, for instance, the outer lens can be configured from zero diopters to plus four diopters. In this manner, the optical assembly disclosed herein enables configuration of the position of a focal plane for a virtual object, while at the same time providing a non-magnified view of the physical world. As discussed below, the optical assembly disclosed herein also utilizes only a single actuator to provide this functionality, thereby providing weight, power, and cost savings as compared to previous solutions.

In embodiments disclosed herein, the power of the optical variable fluid-filled optical lenses is changed by means of a fluid, which is pumped into or out of the optical lenses. Each lens can include one plano substrate surface and one flexible membrane surface. At zero diopters, both surfaces are parallel. As fluid is pumped into a lens, the flexible element becomes convex and the power of the lens becomes positive. As fluid is pumped out of a lens, the flexible element becomes concave and the power of the lens becomes negative. In this manner, the inner lens in a pair of fluid-filled lenses becomes more negative as the outer lens becomes more positive, and the real world appears correctly with no optical power.

In embodiments disclosed herein, a single actuator is utilized for each pair of lenses. The single actuator might, for example, be implemented as an electromagnetic actuator, a lead screw actuator, a shape-changing polymer, or another type of actuator. The single actuator is coupled to a reservoir containing fluid. The reservoir is, in turn, coupled to each lens in a pair of lenses.

When the actuator is activated (e.g. moved), an equal amount of fluid flows into one of the lenses in a pair and out of the other lens. For example, an equal amount of fluid might flow from the inner lens to the reservoir, and from the reservoir to the outer lens. Similarly, an equal amount of fluid might flow from the outer lens to the reservoir, and from the reservoir to the inner lens. In this manner, the amount of fluid in each lens in a pair of optical lenses is maintained in an inverse proportion, thereby ensuring that the optical power of each fluid-filled optical lens cancels out the optical power of the other fluid-filled lens when looking through both lenses. Previous solutions would require two actuators, two reservoirs, and separate supporting electronics for each lens in such a configuration.

In some embodiments, a single actuator is utilized to modify the power of two pair of variable fluid-filled lenses. The single actuator is coupled to a reservoir which, in turn, is coupled to each lens in two pair of variable fluid-filled lenses. When the actuator is activated (e.g. moved), fluid flows from the reservoir to one lens in each pair of fluid-filled optical lenses. Fluid also flows from one lens in each pair of fluid-filled optical lenses to the reservoir. In this manner, a single actuator can be utilized to modify the power of two pair of variable fluid-filled lenses arranged in a stereo configuration while maintaining the correct optical power in each lens in each pair of lenses. Previous solutions would require four actuators, four reservoirs, and separate supporting electronics for each lens in such a configuration.

In some embodiments, the optical assembly also includes an illumination engine for generating a visible light image (e.g. a virtual object). The output of the illumination engine is provided to a waveguide. One lens in a pair of fluid-filled optical lenses is positioned on one side of the waveguide, while another lens from the pair of fluid-filled optical lenses is positioned on another side of the waveguide. The lenses are bonded to the waveguide in some configurations.

The visible light output from the illumination engine travels through the waveguide to one of the lenses of a pair of fluid-filled optical lenses (i.e. the inner lens) for viewing by a user. Light reflected from the physical world passes through the other lens of the pair of fluid-filled optical lenses (i.e. the outer lens), through the waveguide, and through the inner lens so that the physical world can be observed by the user. Because the power of the inner lens and the power of the outer lens cancel one another out, the physical world appears unmagnified to the user. This is true even though the power of the inner lens can be configured (i.e. by pumping fluid into or out of the lens) to position the virtual object focal plane at a desired distance from the user.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following Detailed Description describes optical systems that include a single actuator coupled to multiple variable fluid-filled optical lenses suitable for use in NED devices. By utilizing only a single actuator for modifying the optical power of multiple variable fluid-filled lenses in a NED device, the disclosed optical systems provide important technical benefits, thereby overcoming technical problems with previous optical systems used in NED devices that utilize multiple actuators. As discussed above, these technical benefits can include, but are not limited to, a reduction in the weight, complexity, power consumption, and cost of NED devices, or other types of devices, that utilize the disclosed optical systems. Other technical benefits might also be realized through implementations of the disclosed technologies.

Turning now to the figures (which might be referred to herein as a "FIG." or "FIGS."), additional details will be provided regarding the optical systems disclosed herein with reference to the accompanying drawings that form a part hereof. The FIGS. show, by way of illustration, specific configurations or examples. Like numerals represent like or similar elements throughout the FIGS.

In the FIGS., the left-most digit(s) of a reference number identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

In the figures, numerous optical path segments are illustrated between various components of the optical systems disclosed herein. Unless stated otherwise, individual optical path segments are illustrated to convey the general direction that light travels between two or more components. For example, a particular optical path segment illustrated between a first component and a second component with an arrow pointing toward the second component may generally convey that light propagates along the particular optical path segment from the first component toward the second component However, unless clearly indicated within the Detailed Description, illustrations of an individual optical path segment are not drawn to scale in terms of length, angularity, and/or position with respect to any other individual optical path segment. For example, two separate optical path segments may, in some instances, be illustrated adjacent to one another for aesthetic purposes (e.g., to separately illustrate separate paths) without indicating that these separate optical paths are in practicality adjacent (e.g., they could be on-axis, off-axis, or both).

Figure 1:
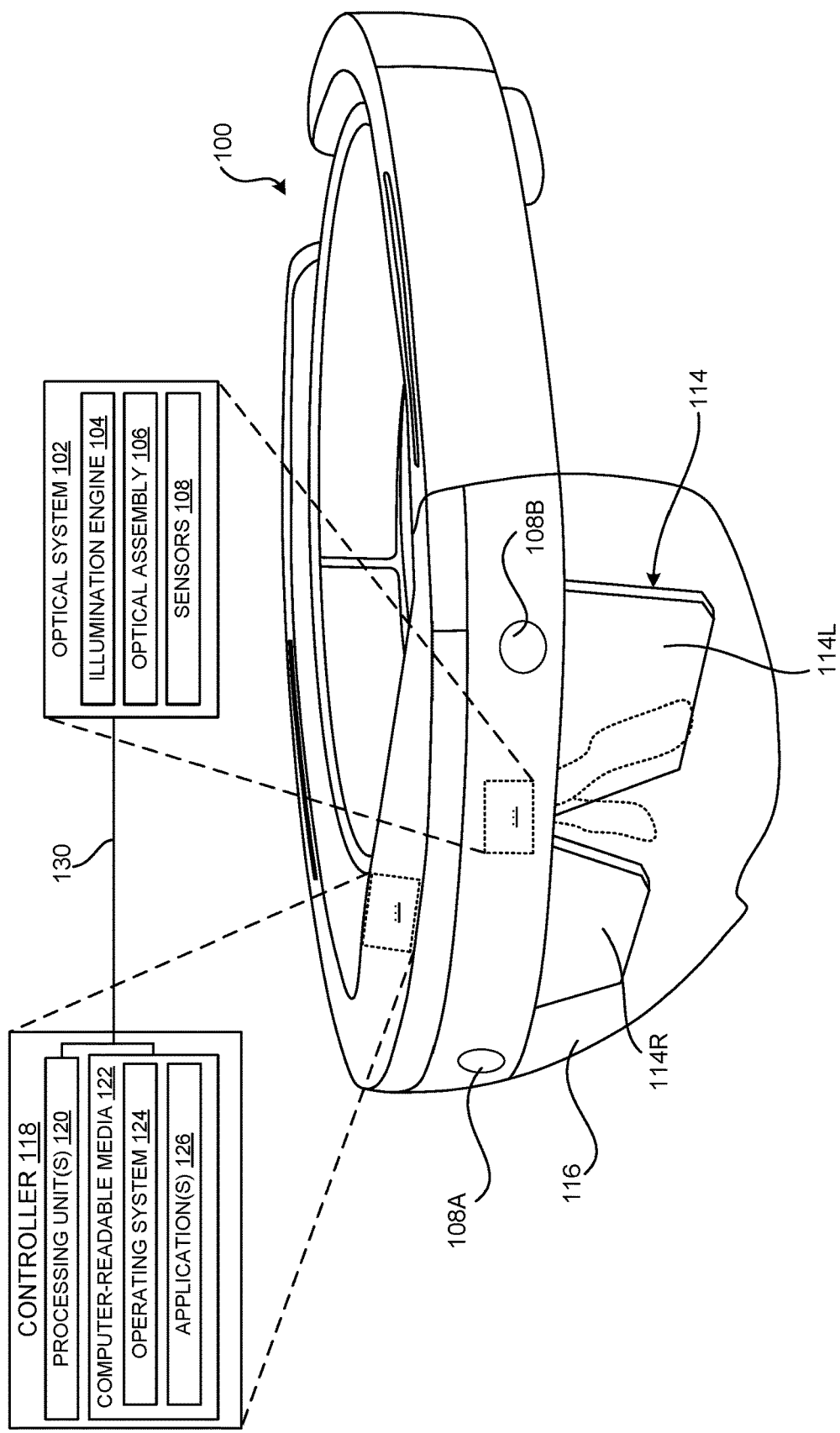
FIG. 1 is a computing device diagram showing aspects of the configuration of a NED device that can implement and utilize the optical systems disclosed herein.

FIG. 1 is a computing device diagram showing aspects of the configuration of an NED device 100 that can implement and utilize the optical systems disclosed herein. The NED device 100 shown in FIG. 1 includes an optical system 102 configured to generate a composite view (e.g., from a perspective of a user that is wearing the NED device 100) that includes both one or more CG images and a view of at least a portion of the real-world environment. For example, the optical system 102 might utilize various technologies such as, for example, augmented reality ("AR") technologies to generate composite views that include CG images superimposed over a real-world view. As such, the optical system 102 might be configured to generate CG images via an optical assembly 106 that includes an illumination engine 104 and a display panel 114.

Various image generation technologies can be used to implement the illumination engine 104. For example, and without limitation, the illumination engine 104 can be implemented using a transmissive projection technology where the light source is modulated by optically active material, backlit with white light. These technologies can be implemented using fluid crystal display ("LCD")-type displays with powerful backlights and high optical energy densities.

The illumination engine 104 might also be implemented using a reflective technology for which external light is reflected and modulated by an optically active material. Digital light processing ("DLP"), fluid crystal on silicon ("LCOS") and MIRASOL display technology from QUAL-COMMN, INC. are all examples of reflective technologies. Additionally, the illumination engine 104 might be implemented using an emissive technology where light is generated by the display, see for example, a PICOP display engine from MICROVISION, INC. Another example of emissive display technology is a micro organic light emitting diode ("OLED") display, such as those provided by EMAGIN and MICROOLED. The illumination engine 102 might be implemented using other types of technologies in other implementations.

In the illustrated example, the display panel 114 includes separate right eye and left eye transparent display panels, labeled 114R and 114L, respectively. In some examples, the display panel 114 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS NED device) and within a dual-eye device (e.g. the MICROSOFT HOLOLENS NED device).

Light received from the real-world environment passes through the see-through display panel 114 to the eye, or eyes, of the user of the NED device 100. Graphical content displayed by right-eye and left-eye display panels, if configured as see-through display panels, might be used to visually augment or otherwise modify the real-world environment viewed by the user through the see-through display panels 114. In this configuration, the user is able to view virtual objects that do not exist within the real-world environment at the same time that the user views physical objects within the real-world environment. This creates an illusion or appearance that the virtual objects are physical objects or physically present light-based effects located within the real-world environment.

In some examples, the display panel 114 is a waveguide-based display that includes one or more diffractive optical elements ("DOEs") for in-coupling incident light into a waveguide (not shown in FIG. 1), expanding the incident light in one or more directions for exit pupil expansion, and/or out-coupling the incident light out of the waveguide (e.g., toward a user's eye). Additional details regarding configurations of the display panel 114 in several embodiments will be provided below with regard to FIGS. 1-3B.

In some examples, the NED device 100 further includes an additional see-through optical component, shown in FIG. 1 in the form of a transparent veil 116 positioned between the real-world environment and the display panel 114. It can be appreciated that the transparent veil 116 might be included in the NED device 100 for purely aesthetic and/or protective purposes.

The NED device 100 might further include various other components (not all of which are shown in FIG. 1), for example, front-facing cameras (e.g. red/green/blue ("RGB"), black & white ("B&W"), or infrared ("IR") cameras), speakers, microphones, accelerometers, gyroscopes, magnetometers, temperature sensors, touch sensors, biometric sensors, other image sensors, energy-storage components (e.g. battery), a communication facility, a global positioning system ("GPS"), a receiver, and, potentially, other types of sensors. Data obtained from one or more sensors 108A and 108B in the NED device 100, some of which are identified above, can be utilized to determine the orientation, location, and movement of the NED device 100 in some configurations.

In the illustrated example, the NED device 100 also includes one or more logic devices and one or more computer memory devices storing instructions executable by the logic device(s) to implement the functionality disclosed herein. In particular, a controller 118 can include one or more processing units 120, one or more computer-readable media 122 for storing an operating system 124, applications 126, and data. As illustrated in FIG. 1, the controller 118 can be coupled to the optical system 102 via an appropriate communications bus. Through this connection, the controller 118 can control aspects of the operation of the optical system 102 such as, for example, providing display signals to the illumination engine 104, receiving data from the sensors 108, and adjusting the configuration of the optical assembly 106, some of which are described below.

The processing unit(s) 120, can represent, for example, a central processing unit ("CPU")-type processor, a graphics processing unit ("GPU")-type processing unit, a field-programmable gate array ("FPGA")", one or more digital signal processors ("DSPs"), or other hardware logic components that might, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 122, can store instructions executable by the processing unit(s) 120, such as instructions which, when executed, adjust aspects of the configuration of the optical assembly 106, in the manner disclosed herein. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the NED device 100, while in some examples one or more of a CPU, GPU, and/or accelerator are located external to the NED device 100.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 2A:
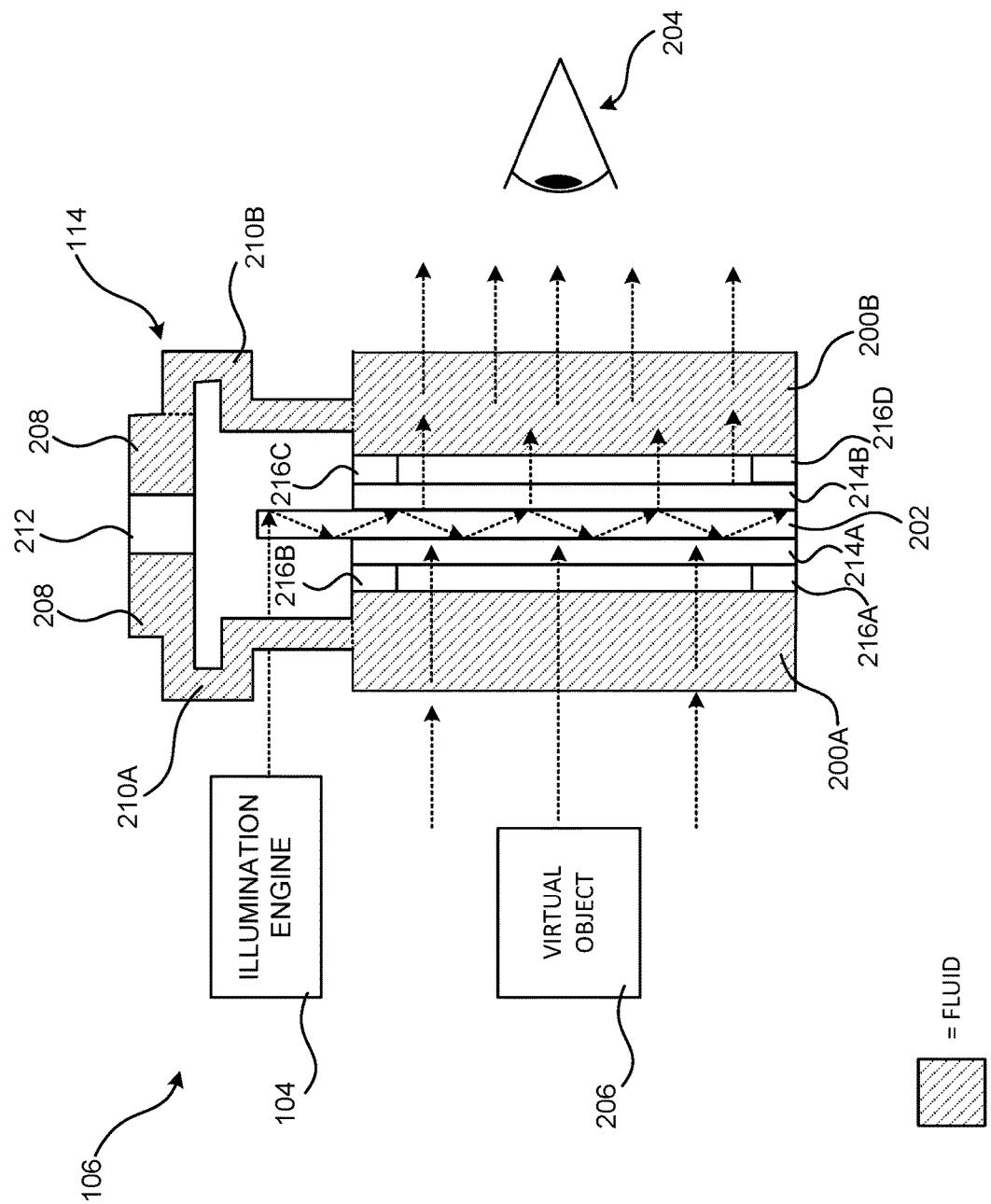
FIGS. 2A and 2B illustrate an exemplary embodiment of an optical system for use in a NED device that includes an illumination engine and an optical assembly having a single actuator coupled to two variable fluid-filled optical lenses.
Figure 2B:
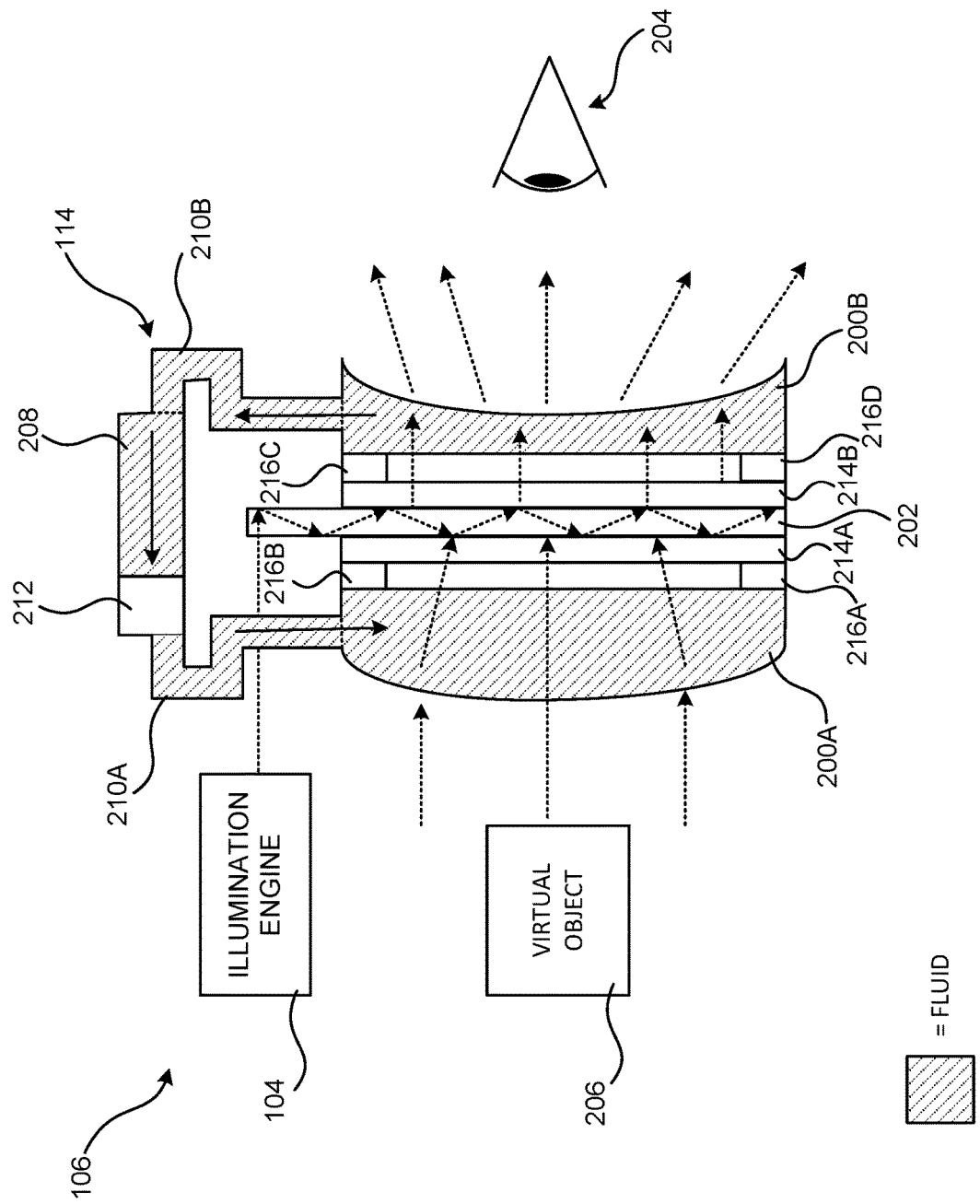

FIGS. 2A and 2B illustrate an exemplary embodiment of an optical system 102 for use in a NED device 100 that includes an illumination engine 104 and an optical assembly 106 having a single actuator coupled to two variable fluid-filled optical lenses. As shown in FIG. 2A and described briefly above, the optical assembly 106 can include illumination engine 104 and one or more diffractive optical elements for in-coupling of the output of the illumination engine 104, expanding an exit pupil of the output to form CG images, and ultimately out-coupling the visual output toward a user's eye 204.

The illumination engine 104 can generate a visible light image (e.g. a virtual object). The output of the illumination engine 104 is provided to a waveguide 202 in one configuration. One lens 200A (i.e. the outer lens) in a pair of fluid-filled optical lenses is positioned on one side of the waveguide 202, while another lens 200B (i.e. the inner lens) of the pair of fluid-filled optical lenses is positioned on another side of the waveguide 202. The lenses 200A and 200B are bonded to the sides of the waveguide 202 in some configurations.

The visible light output from the illumination engine 104 travels through the waveguide 202 to the inner lens 200B of the pair of fluid-filled optical lenses for viewing by a user's eye 204. Light reflected from the physical world passes through the outer lens 200A of the pair of fluid-filled optical lenses 200, through the waveguide 202, and through the inner lens 200B so that the physical world can be observed by the user's eye 204.

In the embodiments disclosed herein, the optical assembly 106 is configured for use with a NED device 100 and includes one or two pair of variable fluid-filled optical lenses 200. The fluid-filled optical lenses 200 can be single membrane or double membrane lenses. The power of one of the lenses 200 of each pair (i.e. the inner lens) can be configured to position a focal plane for a virtual object from infinity to a predefined distance. For example, the inner lens 200B might be configured to position the virtual object focal plane from infinity to 0.25 meters, corresponding to zero diopters to minus four diopters.

Each pair of variable fluid-filled optical lenses 200 also includes a second optical lens 200A (i.e. the outer lens). Each lens 200 might also utilize a glass plate 214 for bonding with the waveguide 202 and one or more spacers 216. The lens 200A utilizes the spacers 216A and 216B and the glass plate 214A. The lens 200B utilizes the spacers 216C and 216D and the glass plate 214B. It is to be appreciated that this configuration is merely illustrative and that other configurations can be utilized in other embodiments.

The power of the inner lens 200B and the power of the outer lens 200A can be maintained such that the power of the inner lens 200B and the power of the outer lens 200A cancel one another out, and the physical world appears unmagnified to the user's eye 204. This is true even though the power of the inner lens 200B can be configured (i.e. by pumping fluid into or out of the lens 200B in the manner described below) to position a virtual object 206 focal plane at a desired distance from the user's eye 204.

In the example given above, for instance, the outer lens 200A can be configured from zero diopters to plus four diopters. In this manner, the optical assembly 106 disclosed herein enables configuration of the position of a focal plane for a virtual object, while at the same time providing a non-magnified view of the physical world to the user's eye 204. As discussed below, the optical assembly 106 disclosed herein also utilizes only a single actuator 212 to provide this functionality, thereby providing weight, power, and cost savings as compared to previous solutions.

In embodiments disclosed herein, the power of the optical variable fluid-filled optical lenses 200 is changed by means of a fluid, which is pumped into or out of the optical lenses 200 by an actuator 212. Each lens 200 can include one plano substrate surface and one flexible membrane surface. At zero diopters, both surfaces are parallel. As the actuator 212 pumps fluid into a lens 200, the flexible element becomes convex and the power of the lens 200 becomes positive. As the actuator 212 pumps fluid out of a lens 200, the flexible element becomes concave and the power of the lens 200 becomes negative. In this manner, the inner lens 200B in a pair of fluid-filled lenses 200 becomes more negative as the outer lens 200A becomes more positive, and the real world appears correctly to the user's eye 204 with no optical power.

In embodiments disclosed herein, a single actuator 212 is utilized for each pair of lenses 200. The single actuator 212 might, for example, be implemented as an electromagnetic actuator, a lead screw actuator, a shape-changing polymer, or another type of actuator. The single actuator 212 is coupled to the controller 118 through the bus 130 so that the processing units 120 can control the operation of the single actuator 212. For example, and without limitation, the operating system 124 or the applications 126 might set the power of the lenses 200 in each pair of lenses 200.

The single actuator 212 is coupled to a reservoir 208 containing fluid appropriate for use in fluid-filled lenses. The reservoir 200 is, in turn, coupled to each lens 200 in a pair of lenses 200. In the examples shown in FIGS. 2A and 2B, for instance, a conduit 210A couples the reservoir 208 to the lens 200A and the conduit 210B couples the reservoir 208 to the lens 200B. Fluid can flow to and from the lenses 200 to the reservoir 208 through the conduits 210. As discussed above, previous solutions would require two actuators, two reservoirs, and separate supporting electronics for each lens in such a configuration.

As illustrated in FIG. 2A, the actuator 212 can be maintained at a location with respect to the reservoir 208 such that equal amounts of fluid are stored in each of the lenses 200A and 200B. In this configuration, the power of each of the lenses 200A and 200B is zero diopters.

When the actuator 212 is activated (e.g. moved) in the manner illustrated with respect to FIG. 2B, fluid flows from the reservoir 208 into the lens 200A and from the lens 200B into the reservoir 208. As a result, the lens 200A becomes convex and the lens 200B becomes concave. Moreover, the amount of fluid in each lens 200 is maintained in an inverse proportion, thereby ensuring that the optical power of each fluid-filled optical lens 200 cancels out the optical power of the other fluid-filled lens 200 when looking through both lenses.

Figure 3A:
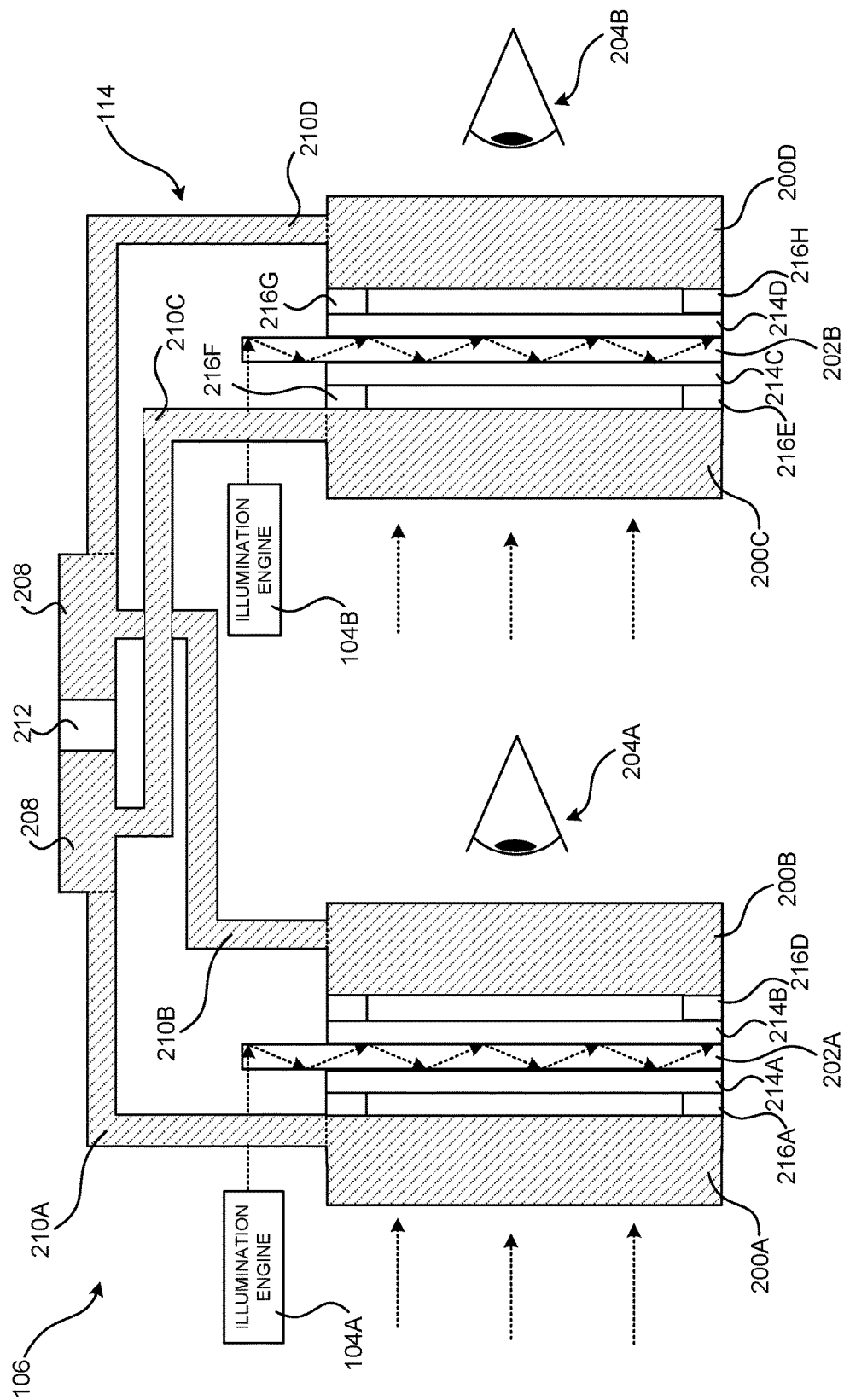
FIGS. 3A and 3B illustrate an exemplary embodiment of an optical system for use in a NED device that includes an illumination engine and an optical assembly having a single actuator coupled to four variable fluid-filled optical lenses.
Figure 3B:
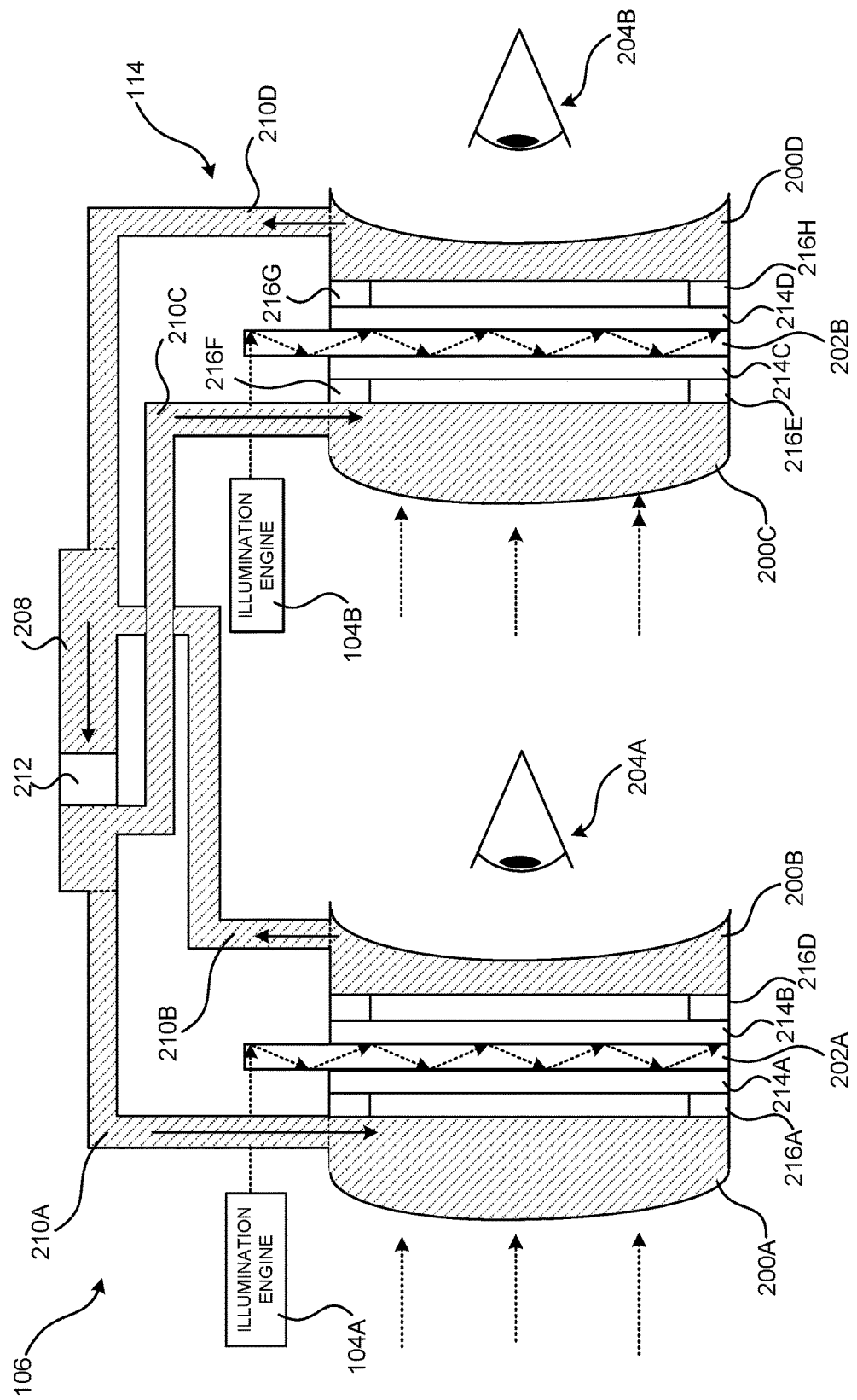

FIGS. 3A and 3B illustrate an exemplary embodiment of an optical system 102 for use in a NED device 100 that includes an illumination engine 104 and an optical assembly 106 having a single actuator 212 coupled to two pair (i.e. four) of variable fluid-filled optical lenses 200. In the embodiments shown in FIGS. 3A and 3B, the NED device 100 includes the ability to provide stereo viewing capabilities. For example, the NED device 100 can be configured to generate a first CG image in front of a user's left eye 204A and to generate a second CG image (which may be identical to the first CG image or different than the first CG image) in front of a user's right eye 204B.

In the embodiments shown in FIGS. 3A and 3B, a single actuator 212 is also utilized to modify the power of two pair of variable fluid-filled lenses 200 (i.e. the lenses 200A, 200B, 200C, and 200D in FIG. 3A). In order to provide this functionality, the single actuator 212 is coupled to the reservoir 208 which, in turn, is coupled to each lens in two pair of variable fluid-filled lenses 200.

In the example shown in FIGS. 3A and 3B, for instance, a conduit 210A couples the reservoir 208 to the lens 200A, the conduit 210B couples the reservoir 208 to the lens 200B, a conduit 210C couples the reservoir 208 to the lens 200C, and the conduit 210D couples the reservoir 208 to the lens 200D. Fluid can flow to and from the lenses 200 to the reservoir 208 through the conduits 210.

When the actuator 212 is activated (e.g. moved), fluid flows from the reservoir 208 to one lens 200 in each pair of fluid-filled optical lenses 200. Fluid also flows from one lens 200 in each pair of fluid-filled optical lenses 200 to the reservoir 208. In this manner, a single actuator 212 can be utilized to modify the power of two pair of variable fluid-filled lenses 200 arranged in a stereo configuration while maintaining the correct optical power in each lens 200 in each pair of lenses 200. Previous solutions would require four actuators, four reservoirs, and separate supporting electronics for each lens in such a configuration.

As illustrated in FIG. 3A, the actuator 212 can be maintained at a location with respect to the reservoir 208 such that equal amounts of fluid are stored in each of the lenses 200A and 200B, and such that equal amounts of fluid are stored in each of the lenses 200C and 200D. In this configuration, the power of each of the lenses 200A and 200B is zero diopters and the power of each of the lenses 200C and 200D is also zero diopters.

When the actuator 212 is activated (e.g. moved) in the manner illustrated with respect to FIG. 3B, fluid flows from the reservoir 208 into the lens 200A and from the reservoir 208 into the lens 200C. Fluid also flows from the lens 200B into the reservoir 208 and from the lens 200D into the reservoir 208. As a result, the lens 200A becomes convex, the lens 200B becomes concave, the lens 200C becomes convex, and the lens 200D becomes concave. Moreover, the amount of fluid in the lenses 200A and 200B and the lenses 200C and 200D is maintained in an inverse proportion, thereby ensuring that the optical power of the fluid-filled optical lens 200A cancels out the optical power of the fluid-filled lens 200B, and that the optical power of the fluid-filled optical lens 200C cancels out the optical power of the fluid-filled lens 200D.

EXAMPLE CLAUSES

The disclosure presented herein also encompasses the subject matter set forth in the following clauses:

Clause 1. An optical assembly, comprising: an illumination engine; and a display panel comprising a waveguide, a single actuator, a reservoir coupled to the single actuator, a first fluid-filled lens coupled to the reservoir and located on a first side of the waveguide, and a second fluid-filled lens coupled to the reservoir and located on a second side of the waveguide, and wherein the actuator is configured, when activated, to cause fluid to flow into the first fluid-filled lens from the reservoir and to cause the fluid to flow out of the second fluid-filled lens into the reservoir.

Clause 2. The optical assembly of clause 1, wherein the first fluid-filled lens is bonded to the first side of the waveguide and wherein the second fluid-filled lens is bonded to the second side of the waveguide.

Clause 3. The optical assembly of any of clauses 1-2, wherein the single actuator comprises an electromagnetic actuator.

Clause 4. The optical assembly of any of clauses 1-3, wherein the single actuator comprises a lead screw actuator.

Clause 5. The optical assembly of any of clauses 1-4, wherein the single actuator comprises a shape-changing polymer.

Clause 6. The optical assembly of any of clauses 1-5, wherein the optical assembly forms a part of a near-eye-display (NED) device.

Clause 7. The optical assembly of any of clauses 1-6, wherein an optical power of the first fluid-filled lens cancels an optical power of the second fluid-filled lens.

Clause 8. An optical assembly, comprising: an illumination engine; and a display panel comprising a first waveguide, a second waveguide, a single actuator, a reservoir coupled to the single actuator, a first fluid-filled lens coupled to the reservoir and located on a first side of the first waveguide, a second fluid-filled lens coupled to the reservoir and located on a second side of the first waveguide, a third fluid-filled lens coupled to the reservoir and located on a first side of the second waveguide, and a fourth fluid-filled lens coupled to the reservoir and located on a second side of the second waveguide, and wherein the actuator is configured, when activated, to cause fluid to flow into the first fluid-filled lens from the reservoir, to cause the fluid to flow out of the second fluid-filled lens to the reservoir, to cause the fluid to flow into the third fluid-filled lens from the reservoir, and to cause the fluid to flow out of the fourth fluid-filled lens into the reservoir.

Clause 9. The optical assembly of clause aim 8, wherein the first fluid-filled lens and the second fluid-filled lens are bonded to the first waveguide, and wherein the third fluid-filled lens and the fourth fluid-filled lens are bonded to the second waveguide.

Clause 10. The optical assembly of any of clauses 8-9, wherein the single actuator comprises an electromagnetic actuator.

Clause 11. The optical assembly of any of clauses 8-10, wherein the single actuator comprises a lead screw actuator.

Clause 12. The optical assembly of any of clauses 8-11, wherein the single actuator comprises a shape-changing polymer.

Clause 13. The optical assembly of any of clauses 8-12, wherein the optical assembly forms a part of a near-eye-display (NED) device.

Clause 14. The optical assembly of any of clauses 8-13, wherein an optical power of the first fluid-filled lens cancels an optical power of the second fluid-filled lens, and wherein an optical power of the third fluid-filled lens cancels an optical power of the fourth fluid-filled lens.

Clause 15. An optical assembly, comprising: a first waveguide; a first fluid-filled lens located on a first side of the first waveguide; a second fluid-filled lens located on a second side of the first waveguide; and a single actuator configured, upon activation, to cause fluid to flow from a reservoir into the first fluid-filled lens and to cause the fluid to flow out of the second fluid-filled lens into the reservoir.

Clause 16. The optical assembly of clause 15, wherein an optical power of the first fluid-filled lens cancels an optical power of the second fluid-filled lens.

Clause 17. The optical assembly of any of clauses 15-16, wherein the first fluid-filled lens and the second fluid-filled lens are bonded to the first waveguide.

Clause 18. The optical assembly of any of clauses 15-17, further comprising: a second waveguide; a third fluid-filled lens located on a first side of the second waveguide; and a fourth fluid-filled lens located on a second side of the second waveguide, and wherein the single actuator is further configured, upon activation, to cause the fluid to flow from the reservoir into the third fluid-filled lens and to cause the fluid to flow out of the fourth fluid-filled lens into the reservoir.

Clause 19. The optical assembly of any of clauses 15-18, wherein an optical power of the third fluid-filled lens cancels an optical power of the fourth fluid-filled lens.

Clause 20. The optical assembly of any of clauses 15-19, wherein the third fluid-filled lens and the fourth fluid-filled lens are bonded to the second waveguide.

Based on the foregoing, it should be appreciated that optical systems have been disclosed herein that include a single actuator coupled to one or more pair of variable fluid-filled optical lenses. The disclosed optical systems provide important technical benefits, thereby overcoming technical problems with previous optical systems used in NED devices. As discussed above, these technical benefits can include, but are not limited to, a reduction in the weight, complexity, power consumption, and cost of NED devices that utilize the disclosed optical systems. Other technical benefits might also be realized through implementations of the disclosed technologies.

Although the subject matter presented herein has been described in language specific to hardware configurations, computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the claims below.

What is claimed is:

1. An optical assembly, comprising:
   an illumination engine; and
   a display panel comprising:
     a waveguide,
     a single actuator,
     a reservoir coupled to the single actuator,
     a first fluid-filled lens coupled to the reservoir and located on a first side of the waveguide, and
     a second fluid-filled lens coupled to the reservoir and located on a second side of the waveguide,
     wherein the actuator is configured, when activated, to cause fluid to flow into the first fluid-filled lens from the reservoir and to cause the fluid to flow out of the second fluid-filled lens into the reservoir.

2. The optical assembly of claim 1, wherein the first fluid-filled lens is bonded to the first side of the waveguide and wherein the second fluid-filled lens is bonded to the second side of the waveguide.

3. The optical assembly of claim 1, wherein the single actuator comprises an electromagnetic actuator.

4. The optical assembly of claim 1, wherein the single actuator comprises a lead screw actuator.

5. The optical assembly of claim 1, wherein the single actuator comprises a shape-changing polymer.

6. The optical assembly of claim 1, wherein the optical assembly forms a part of a near-eye-display (NED) device.

7. The optical assembly of claim 1, wherein an optical power of the first fluid-filled lens cancels an optical power of the second fluid-filled lens.

8. An optical assembly, comprising:
   an illumination engine; and
   a display panel comprising:
     a first waveguide,
     a second waveguide,
     a single actuator,
     a reservoir coupled to the single actuator,
     a first fluid-filled lens coupled to the reservoir and located on a first side of the first waveguide,
     a second fluid-filled lens coupled to the reservoir and located on a second side of the first waveguide,
     a third fluid-filled lens coupled to the reservoir and located on a first side of the second waveguide, and
     a fourth fluid-filled lens coupled to the reservoir and located on a second side of the second waveguide,
     wherein the actuator is configured, when activated, to cause fluid to flow into the first fluid-filled lens from the reservoir, to cause the fluid to flow out of the second fluid-filled lens to the reservoir, to cause the fluid to flow into the third fluid-filled lens from the reservoir, and to cause the fluid to flow out of the fourth fluid-filled lens into the reservoir.

9. The optical assembly of claim 8, wherein the first fluid-filled lens and the second fluid-filled lens are bonded to the first waveguide, and wherein the third fluid-filled lens and the fourth fluid-filled lens are bonded to the second waveguide.

10. The optical assembly of claim 8, wherein the single actuator comprises an electromagnetic actuator.

11. The optical assembly of claim 8, wherein the single actuator comprises a lead screw actuator.

12. The optical assembly of claim 8, wherein the single actuator comprises a shape-changing polymer.

13. The optical assembly of claim 8, wherein the optical assembly forms a part of a near-eye-display (NED) device.

14. The optical assembly of claim 8, wherein an optical power of the first fluid-filled lens cancels an optical power of the second fluid-filled lens, and wherein an optical power of the third fluid-filled lens cancels an optical power of the fourth fluid-filled lens.

15. An optical assembly, comprising:
    a first waveguide;
    a first fluid-filled lens located on a first side of the first waveguide;
    a second fluid-filled lens located on a second side of the first waveguide; and
    a single actuator configured, upon activation, to cause fluid to flow from a reservoir into the first fluid-filled lens and to cause the fluid to flow out of the second fluid-filled lens into the reservoir.

16. The optical assembly of claim 15, wherein an optical power of the first fluid-filled lens cancels an optical power of the second fluid-filled lens.

17. The optical assembly of claim 15, wherein the first fluid-filled lens and the second fluid-filled lens are bonded to the first waveguide.

18. The optical assembly of claim 15, further comprising:
    a second waveguide;
    a third fluid-filled lens located on a first side of the second waveguide; and
    a fourth fluid-filled lens located on a second side of the second waveguide,
    wherein the single actuator is further configured, upon activation, to cause the fluid to flow from the reservoir into the third fluid-filled lens and to cause the fluid to flow out of the fourth fluid-filled lens into the reservoir.

19. The optical assembly of claim 18, wherein an optical power of the third fluid-filled lens cancels an optical power of the fourth fluid-filled lens.

20. The optical assembly of claim 18, wherein the third fluid-filled lens and the fourth fluid-filled lens are bonded to the second waveguide.

* * * * *